United States Patent
Chen et al.

(10) Patent No.: US 8,982,077 B2
(45) Date of Patent: Mar. 17, 2015

(54) PORTABLE ELECTRONIC APPARATUS TO BYPASS SCREEN LOCK MODE FOR ELECTRONIC NOTEBOOK AND OPERATION METHOD THEREOF AND COMPUTER READABLE MEDIA

(75) Inventors: Ying-Ju Chen, Taoyuan County (TW); David Folchi, Bellevue, WA (US)

(73) Assignee: HTC Corporation, Taoyuan (TW)

( * ) Notice: Subject to any disclaimer, the term of this patent is extended or adjusted under 35 U.S.C. 154(b) by 135 days.

(21) Appl. No.: 13/615,660

(22) Filed: Sep. 14, 2012

(65) Prior Publication Data

US 2013/0069896 A1 Mar. 21, 2013

Related U.S. Application Data

(60) Provisional application No. 61/535,350, filed on Sep. 15, 2011.

(51) Int. Cl.
*G06F 3/14* (2006.01)
*H04M 1/66* (2006.01)
(Continued)

(52) U.S. Cl.
CPC ......... *G06F 3/0488* (2013.01); *H04W 52/0274* (2013.01); *H04M 1/67* (2013.01);
(Continued)

(58) Field of Classification Search
CPC ... G06F 3/0488; G06F 1/3231; G06F 9/4443; G06F 1/3265; G06F 1/3234; G06F 1/3206; G06F 21/31; G06F 2221/2137; G06F 1/32; G06F 2221/2149; G06F 3/04187; G06F 1/3218; G06F 1/3203; H04M 2250/22; H04M 1/673; H04M 1/67; H04W 52/0254; H04W 12/08; H04W 52/0251; H04W 52/0264; H04W 52/207; H04W 52/0274; H04W 12/06; H04W 52/0278; G09G 2330/021
USPC .................. 345/173; 455/574, 410, 411, 418; 713/100; 715/863
See application file for complete search history.

(56) References Cited

U.S. PATENT DOCUMENTS 7,562,241 B2    7/2009  Nurmi
8,811,948 B2 *  8/2014  Bandyopadhyay et al. .. 455/411
(Continued)

FOREIGN PATENT DOCUMENTS

CN    1491379 A    4/2004
CN    101371258 A  2/2009
(Continued)

OTHER PUBLICATIONS

"Search Report of European Counterpart Application", issued on Jan. 24, 2013, p. 1-p. 3, in which the listed references (Ref.1-Ref.6) were cited.

(Continued)

*Primary Examiner* — Dwayne Bost
*Assistant Examiner* — Larry Sternbane
(74) *Attorney, Agent, or Firm* — Jianq Chyun IP Office

(57) ABSTRACT

A portable electronic apparatus and an operation method thereof and a computer readable media are provided. The portable electronic apparatus comprises a touch display unit, and an electronic notebook is displayed in the touch display unit. When the touch display enters a power saving mode, and a trigger event is detected, the power saving mode is ended, and the electronic notebook is directly displayed in the touch display unit without displaying a screen lock mode before displaying the electronic notebook.

19 Claims, 4 Drawing Sheets

(51) Int. Cl.
*H04M 1/68* (2006.01)
*H04M 3/16* (2006.01)
*G06F 3/041* (2006.01)
*G06F 3/0488* (2013.01)
*H04W 52/02* (2009.01)
*H04M 1/67* (2006.01)
*G06F 1/32* (2006.01)

(52) U.S. Cl.
CPC ........ *H04W52/0254* (2013.01); *H04W 52/027* (2013.01); *G06F 1/3203* (2013.01); *G06F 2221/2149* (2013.01); *H04M 2250/22* (2013.01); *Y02B 60/50* (2013.01)
USPC ............ 345/173; 455/411; 455/574; 715/864

(56) References Cited

U.S. PATENT DOCUMENTS

| | | |
|---|---|---|
| 2003/0169306 A1 | 9/2003 | Makipaa et al. |
| 2004/0150664 A1 | 8/2004 | Baudisch |
| 2006/0075347 A1* | 4/2006 | Rehm ........................... 715/727 |
| 2006/0200524 A1 | 9/2006 | Costenaro et al. |
| 2006/0230331 A1 | 10/2006 | Abanami et al. |
| 2007/0018957 A1 | 1/2007 | Seo |
| 2007/0150842 A1 | 6/2007 | Chaudhri et al. |
| 2007/0157089 A1 | 7/2007 | Van Os et al. |
| 2009/0006991 A1 | 1/2009 | Lindberg et al. |
| 2010/0001967 A1 | 1/2010 | Yoo |
| 2010/0058244 A1 | 3/2010 | Wang |
| 2010/0159995 A1 | 6/2010 | Stallings et al. |
| 2010/0223569 A1 | 9/2010 | Vuong et al. |
| 2010/0257490 A1 | 10/2010 | Lyon et al. |
| 2010/0269040 A1* | 10/2010 | Lee ............................... 715/702 |
| 2010/0306718 A1 | 12/2010 | Shim et al. |
| 2011/0035691 A1 | 2/2011 | Kim |
| 2011/0041102 A1 | 2/2011 | Kim |
| 2011/0047368 A1* | 2/2011 | Sundaramurthy et al. .... 713/100 |
| 2011/0105193 A1 | 5/2011 | Lee et al. |
| 2011/0119625 A1 | 5/2011 | Moon |
| 2012/0233571 A1* | 9/2012 | Wever et al. ................... 715/835 |

FOREIGN PATENT DOCUMENTS

| | | |
|---|---|---|
| CN | 101385318 | 3/2009 |
| CN | 101404680 A | 4/2009 |
| CN | 101763284 | 6/2010 |
| CN | 101828162 | 9/2010 |
| CN | 101976171 | 2/2011 |
| CN | 102239469 | 11/2011 |
| EP | 2060970 | 5/2009 |
| TW | 200928952 | 7/2009 |
| TW | 201030573 | 8/2010 |
| TW | 201129926 | 9/2011 |
| WO | 2010136854 | 12/2010 |

OTHER PUBLICATIONS

"Search Report of European Counterpart Application", issued on Jan. 21, 2013, p. 1-p. 3, in which the listed references (Ref.5-Ref.7) were cited.
"Search Report of European Counterpart Application", issued on Jan. 18, 2013, p. 1-p. 4, in which the listed references (Ref.5, Ref.6, and Ref.8-Ref.11) were cited.
"Office Action of European Counterpart Application", issued on Jan. 30, 2013, p. 1-p. 5, in which the listed references (Ref.5, Ref.6, and Ref.8-Ref.11) were cited.
"Search Report of European Counterpart Application", issued on May 23, 2012, p. 1-p. 3, in which the listed references (Ref.4, Ref.8, Ref.12, and Ref.13) were cited.
"First Office Action of China Counterpart Application", issued on Mar. 4, 2014, p. 1-p. 10, in which the listed references were cited.
"Office Action of China Counterpart Application", issued on Feb. 21, 2014, p. 1-p. 8, in which the listed reference was cited.
"Office Action of America Co-pending (U.S. Appl. No. 13/398,857)", issued on Aug. 23, 2013, p. 1-p. 24.
"Office Action of US Counterpart Application", issued on Sep. 12, 2013, p. 1-p. 36, in which the listed references were cited.
"Office Action of Europe Counterpart Application", issued on Feb. 8, 2013, p. 1-p. 8.
"Office Action of China Counterpart Application", issued on Jan. 28, 2014, p. 1-p. 7, in which the listed references were cited.
"Office Action of Taiwan Counterpart Application", issued on May 16, 2014, p. 1-p. 10, in which the listed references were cited.
"Office Action of China Counterpart Application", issued on Jul. 25, 2014, p. 1-p. 8, in which the listed reference was cited.
"Office Action of Taiwan Counterpart Application", issued on Aug. 25, 2014, p. 1-p. 8, in which the listed references were cited.
"Office Action of U.S. Co-pending Application, U.S. Appl. No. 13/398,857", issued on Nov. 5, 2014, p. 1-p. 24, in which the listed U.S. Application Publication reference was cited.
"Office Action of China Counterpart Application", issued on Nov. 2, 2014, p. 1-p. 7, in which the other listed references were cited.

* cited by examiner

PORTABLE ELECTRONIC APPARATUS TO BYPASS SCREEN LOCK MODE FOR ELECTRONIC NOTEBOOK AND OPERATION METHOD THEREOF AND COMPUTER READABLE MEDIA

CROSS-REFERENCE TO RELATED APPLICATION

This application claims the priority benefits of U.S. provisional application Ser. No. 61/535,350, filed on Sep. 15, 2011. The entirety of the above-mentioned patent applications is hereby incorporated by reference herein and made a part of this specification.

BACKGROUND

1. Technical Field

The invention relates to an operation method of an electronic apparatus. Particularly, the invention relates to an operation mechanism of a portable electronic apparatus having a touch display unit.

2. Description of the Background Art

To cope with modern busy lifestyle, various mobile devices occupying less space and easy to carry are developed. For example, cellular phones, personal digital assistant (PDA) phones, smartphones, etc. are widely used to help people to communicate with each other at anytime anywhere, and become indispensable tools in people's daily life.

Along with quick development of communication technology, since the mobile device such as the smartphone is portable and can be used to easily access the Internet, and the number of applications that can be used on the smartphone is gradually increased, the smartphone becomes an indispensable part of people's daily life. Moreover, regarding a portable electronic apparatus (for example, a mobile phone) emphasising on compact, lightweight and easy-to-carry, usage of a touch screen has gradually become a mainstream in design.

The touch screen can not only serve as an input interface while displaying images, but also has advantages of low cost and durability, which gradually becomes a new trend on the display market. A user may feel the convenience while performs operations through the touch screen, and compatibility and lightweight of the product also bring convenience to the user.

However, when a current portable electronic apparatus enters a power saving mode or a screen thereon is power off, it enters a screen lock mode. Before the portable electronic apparatus is used for the next time, the screen lock mode is first unlocked to facilitate subsequent operations. Therefore, in some specific use cases, it may cause inconvenience as the user has to spend extra time on unlocking

SUMMARY

The application is directed to a portable electronic apparatus, an operation method thereof and computer readable media, which helps improving operation convenience of the portable electronic apparatus.

The application provides an operation method, which is adapted to a portable electronic apparatus having a touch display unit, where the portable electronic apparatus has a power saving mode and a screen lock mode, and the method comprises following steps. The touch display unit enters the power saving mode. When a trigger event is detected, the power saving mode is ended, and the screen lock mode is displayed. When a screen unlock action is detected, the screen lock mode is ended. An electronic notebook is activated and is displayed in the touch display unit. The touch display unit enters the power saving mode under the condition that the electronic notebook is activated. When the trigger event is detected, the power saving mode is ended, and the electronic notebook is directly displayed in the touch display unit without displaying the screen lock mode.

The application provides an operation method, which is adapted to a portable electronic apparatus having a touch display unit, where the portable electronic apparatus has a power saving mode and a screen lock mode, and the method comprises following steps. The touch display unit enters the power saving mode. When a trigger event is detected, the power saving mode is ended, and the screen lock mode is entered. When a screen unlock action is detected, the screen lock mode is ended. An electronic notebook is activated and is displayed in the touch display unit, and a sound recording function of the electronic notebook is activated under the condition that the electronic notebook is activated. The touch display unit enters the power saving mode under the condition that the electronic notebook and the sound recording function are activated. When the trigger event is detected, the power saving mode is ended, and the electronic notebook is directly displayed in the touch display unit without displaying the screen lock mode.

The application provides a portable electronic apparatus comprising a touch display unit, a processing unit, an adjusting unit, and a detection unit. The processing unit is coupled to the touch display unit and activates an electronic notebook for displaying in the touch display unit. The adjusting unit is coupled to the processing unit and the touch display unit, and adjusts the portable electronic apparatus to enter a power saving mode or a screen lock mode. The detection unit is coupled to the processing unit, and detects whether a trigger event user for ending the power saving mode is occurred. When the electronic notebook is not activated and the adjusting unit adjusts the portable electronic apparatus to enter the power saving mode, if the detection unit detects the trigger event, the power saving mode is ended, and the screen lock mode is displayed in the touch display unit. When the electronic notebook is activated and the adjusting unit adjusts the portable electronic apparatus to enter the power saving mode, if the detection unit detects the trigger event, the power saving mode is ended, and the electronic notebook is directly displayed in the touch display unit without displaying the screen lock mode.

The application provides a portable electronic apparatus comprising a touch display unit, a processing unit, an adjusting unit and a detection unit. The processing unit is coupled to the touch display unit and activates an electronic notebook for displaying in the touch display unit, and activates a sound recording function of the electronic notebook. The adjusting unit is coupled to the processing unit and the touch display unit, and adjusts the portable electronic apparatus to enter a power saving mode or a screen lock mode. The detection unit is coupled to the processing unit, and detects whether a trigger event user for ending the power saving mode is occurred. When the electronic notebook is not activated and the adjusting unit adjusts the portable electronic apparatus to enter the power saving mode, if the detection unit detects the trigger event, the power saving mode is ended, and the screen lock mode is displayed in the touch display unit. When the electronic notebook is activated, though the sound recording function of the electronic notebook is not activated and the adjusting unit adjusts the portable electronic apparatus to enter the power saving mode, if the detection unit detects the trigger event, the power saving mode is ended, and the screen lock mode is displayed in the touch display unit. When the electronic notebook and the sound recording function of the electronic notebook are activated and the adjusting unit adjusts the portable electronic apparatus to enter the power saving mode, if the detection unit detects the trigger event, the power saving mode is ended, and the electronic notebook is directly displayed in the touch display unit without displaying the screen lock mode.

According to the above descriptions, the power saving mode is entered when the electronic notebook is activated or when the electronic notebook and the sound recording function are simultaneously activated, and after the power saving mode is ended, the electronic notebook is directly displayed without displaying the screen lock mode. In this way, the time used for executing a screen unlock action is saved, which helps improving operation convenience of the portable electronic apparatus.

In order to make the aforementioned and other features and advantages of the application comprehensible, several exemplary embodiments accompanied with figures are described in detail below.

BRIEF DESCRIPTION OF THE DRAWINGS

The accompanying drawings are included to provide a further understanding of the application, and are incorporated in and constitute a part of this specification. The drawings illustrate embodiments of the application and, together with the description, serve to explain the principles of the application.

DETAILED DESCRIPTION OF DISCLOSED EMBODIMENTS

Generally, when a portable electronic apparatus enters a power saving mode, it also enables a screen lock mode, and the screen lock mode is displayed after the power saving mode is ended. A main function of the screen lock mode is to prevent a user from inadvertently touching the screen, so that the user cannot operate the screen or can only operate specific functions under the screen lock mode. The user has to use a specific operation method such as a specific input method or a specific operation gesture to unlock the screen lock mode before normally operating the portable electronic apparatus by touching. When a portable electronic apparatus enters the power saving mode and the user wants to operate the portable electronic apparatus for the next time, after the power saving mode is ended, the screen lock mode has to be unlocked before usage, so that extra time is spent, which may cause inconvenience in operation in some cases. For example, when the user wants to use the electronic notebook after the portable electronic apparatus enters the power saving mode, the user generally wants to immediately use the electronic notebook after ending the power saving mode, and now if extra time has to be spent to unlock the screen lock mode, it causes inconvenience in operation. Especially when a user needs to take notes for a long time, he/she usually needs to record at the same time to avoid missing any important information. When recording, the user might not be writing or operating the portable electronic apparatus which causes the portable electronic apparatus to enter the power saving mode. If the user wants to take notes immediately, it is very inconvenient that as the user has to unlock the screen lock mode after exiting the power saving mode. Therefore, the application provides a portable electronic apparatus and an operation method thereof and computer readable media, which helps improving operation convenience of the portable electronic apparatus. In order to fully convey the spirit of the application, embodiments are provided below for descriptions.

Figure 1:
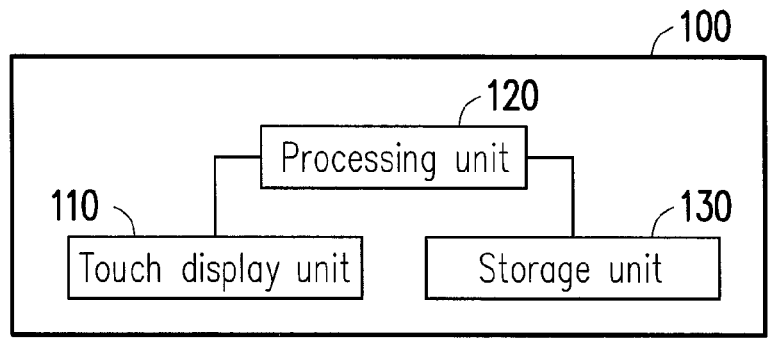
FIG. 1 is a block diagram of a portable electronic apparatus according to an embodiment of the application.

FIG. 1 is a block diagram of a portable electronic apparatus according to an embodiment of the application. Referring to FIG. 1, the portable electronic apparatus 100 is, for example, a mobile phone, a smartphone, a personal computer, a notebook computer, a tablet computer, a navigation apparatus, an electronic game machine, a multimedia player, etc., that has a touch display unit. The portable electronic apparatus 100 comprises a touch display unit 110, a processing unit 120, and a storage unit 130. The processing unit 120 is coupled to the touch display unit 110 and the storage unit 130.

The touch display unit 110 is, for example, a screen having a touch operation function, such as a capacitive screen, a resistive screen, an acoustic wave screen, or a screen having the touch operation function after combining with other devices. The portable electronic apparatus 100 receives user's operations through the touch display unit 110 and executes the corresponding operations.

The processing unit 120 is, for example, a central processing unit (CPU) or a microprocessor, etc., which is used to execute hardware or firmware in the portable electronic apparatus 100 or process data in software.

The storage unit 130 is, for example, a non-volatile memory (NVM), a dynamic random access memory (DRAM) or a static random access memory (SRAM), etc. Here, the storage unit 130 stores a plurality program codes, and after the program codes are loaded, the processing unit 120 executes the program codes. The program codes comprise a plurality of instructions, and the processing unit 120 can execute the instructions to implement a plurality of steps of the operation method. In the present embodiment, the portable electronic apparatus 100 only includes one processing unit 120, and in other embodiments, the portable electronic apparatus 100 may include a plurality of processing units, and theses processing units execute the loaded program codes.

Figure 2:
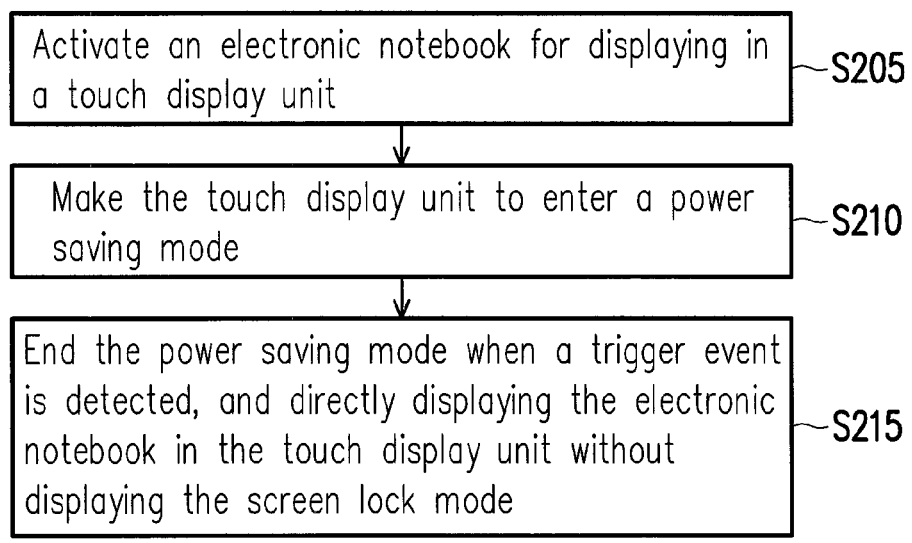
FIG. 2 is a flowchart of an operation method according to an embodiment of the application.

FIG. 2 is a flowchart of an operation method according to an embodiment of the application. The present embodiment is adapted to the portable electronic apparatus 100 having the touch display unit 110. Referring to FIG. 1 and FIG. 2, in the step S205, an electronic notebook is activated through the processing unit 120, and is displayed in the touch display unit 110, wherein the electronic notebook may be a notebook application in the electronic apparatus 100 for the user to record information in text and use functions such as drawings, photographs, sound recordings, and videos, etc. for recording or may be an application in the portable electronic apparatus 100 with a function similar with a notebook. Now, the touch display unit 110 is in a normal operation mode. Then, under the condition that the electronic notebook is activated, the processing unit 120 may enable a notebook function. For example, the electronic notebook has functions of camera, sound recording, and video recording, etc., and when the user uses the electronic notebook, the user may also use the functions of camera, sound recording, and video recording to take photos, record sound, and record video simultaneously.

Figure 3:
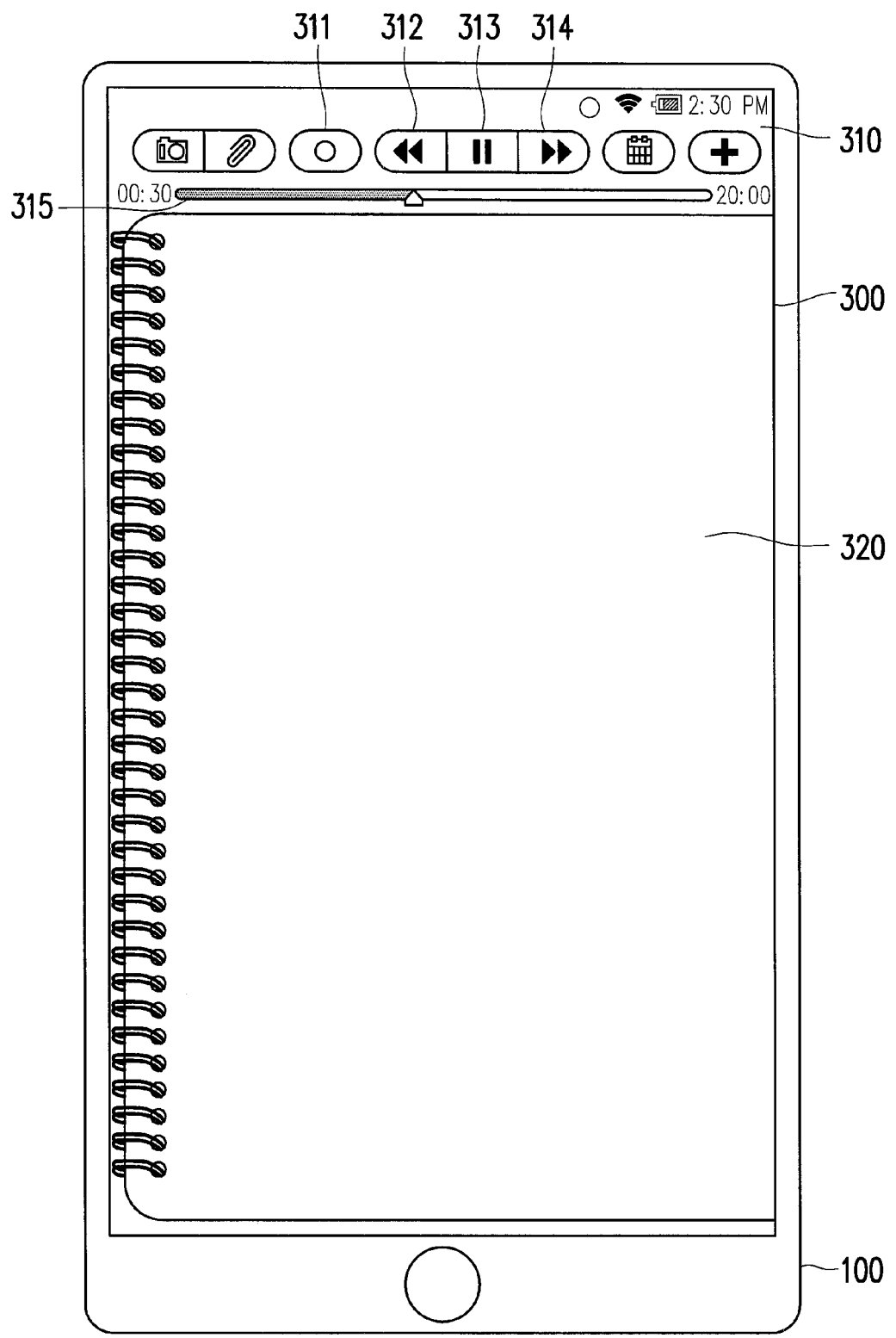
FIG. 3 is a schematic diagram of a display frame according to an embodiment of the application.

For example, FIG. 3 is a schematic diagram of a display frame according to an embodiment of the application. In the present embodiment, the portable electronic apparatus 100 is, for example, a smartphone or a tablet computer. Referring to FIG. 1 and FIG. 3, the display frame of the touch display unit 110 displays a user interface 300 of an electronic notebook, which includes a toolbar 310 and a write page 320. The toolbar 310 comprises function keys such as a recording key 311, a back key 312, a pause key 313, a forward key 314, and a time bar 315, etc. In this way, while the write page 320 of the electronic notebook is used, the recording key 311 may be enabled to execute the sound recording function. While the sound recording function is executed, an note can be written down or can be recorded through the drawing function or the camera function.

Then, in step S210, if the portable electronic apparatus 100 does not receive user's operation for a predetermined time, or is triggered via the user's operation, the processing unit 120 makes the touch display unit 110 to enter the power saving mode. For example, the processing unit 120 adjusts a brightness of the touch display unit 110, which comprises dimming the display frame of the touch display unit 110 or directly turning off the display frame of the touch display unit 110. Here, the predetermined time is, for example, 30 seconds, 1 minute, or 5 minutes, etc., which may be directly preset in the setting of the portable electronic apparatus 100 or in the setting of the electronic notebook and may be adjusted by the user. Moreover, the power saving mode may comprises an idle mode, a sleep mode, or other mode that can dim or directly turn off the frame of the touch display unit 110 to save power, and under such mode, since the frame of the touch display unit 110 is dimmed or directly turned off, power output of the portable electronic apparatus 100 can be reduced. When the electronic notebook is activated, the portable electronic apparatus 100 and the touch display unit 110 are usually in a normal operation mode.

Then, when a trigger event is detected, as shown in step S215, the processing unit 120 ends the power saving mode, and directly displays the electronic notebook in the touch display unit 110 without displaying the screen lock mode. For example, when the power saving mode is ended (i.e. the normal operation mode is recovered), the processing unit 120 adjusts the brightness of the touch display unit 110 to brighten the frame of the touch display unit 110 or directly turns on the power of the touch display unit 110 to display the display frame of the touch display unit 110. Namely, under the condition that the electronic notebook of the portable electronic apparatus 100 is not activated, when the power saving mode is ended, the portable electronic apparatus 100 enters the screen lock mode first and then the user needs to unlock the screen lock mode; under the condition that the electronic notebook of the portable electronic apparatus 100 is activated, when the power saving mode is ended, the electronic notebook is directly displayed without entering the screen lock mode. In this way, when the power saving mode is ended, the electronic notebook can be quickly displayed in the touch display unit 120.

The trigger event may comprise one of the following circumstances or combinations thereof: a displacement of the portable electronic apparatus 100 is detected through a motion sensor, a touch signal of the touch display unit 110 is detected through a touch sensor, a touch object is detected within a specified range of the touch display unit 110 through a hand sensor, and a touch object is detected through a hand sensor, or the user presses a power button or a specific button of the portable electronic apparatus 100 to exit the power saving mode.

Moreover, if the user have set a security password or a pattern, under the condition that the electronic notebook of the portable electronic apparatus 100 is not activated, when the screen lock mode is ended, the user is still required to input the security password or the pattern to release the security protection. In an embodiment of the application, under the condition that the electronic notebook of the portable electronic apparatus 100 is activated, when the power saving mode is ended, neither the screen lock mode is entered nor the user is required to input the security password or the pattern, but the electronic notebook is directly displayed.

Moreover, in another embodiment, when the portable electronic apparatus 100 is in the screen lock mode, a short cut related to the electronic notebook may be displayed in the screen lock mode, for example, a short cut used for creating a new notebook document, a recording short cut, a camera short cut, and a notebook searching short cut, etc. When the user triggers a short cut under the screen lock mode, the screen lock mode is directly unlocked and the function related to the short cut is executed. For example, when the user triggers the short cut used for creating a new notebook document, the screen lock mode is unlocked and a new notebook document is directly activated and displayed; when the user triggers the recording short cut, the screen lock mode is unlocked and the electronic notebook is directly activated, and meanwhile the sound recording function is activated; when the user triggers the camera short cut, the screen lock mode is unlocked and the electronic notebook is directly activated, and meanwhile the camera function is activated, wherein the camera function is for taking a photo and automatically associating the photo with the note document; when the user triggers the notebook searching short cut, the frame under the screen lock mode is unlocked and the function of searching the electronic notebook documents is directly activated.

Figure 4A:
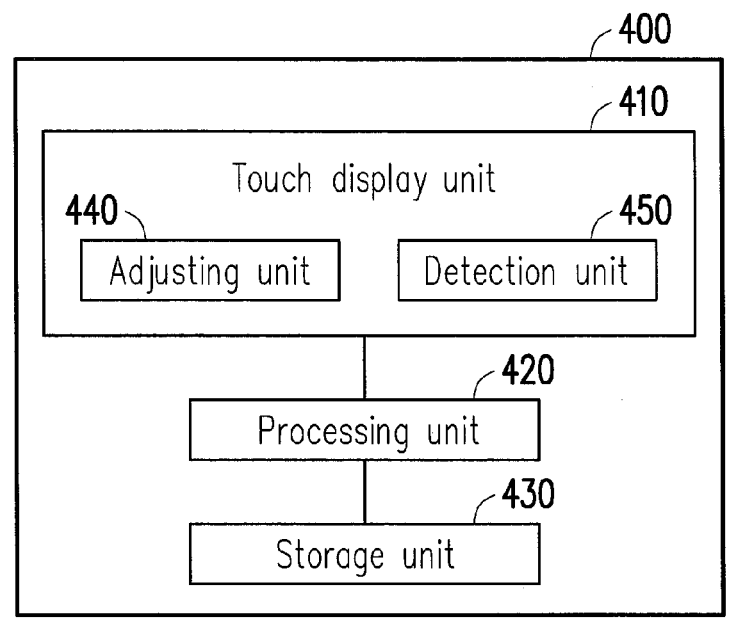
FIG. 4A and FIG. 4B are block diagrams of a portable electronic apparatus according to another embodiment of the application.
Figure 4B:
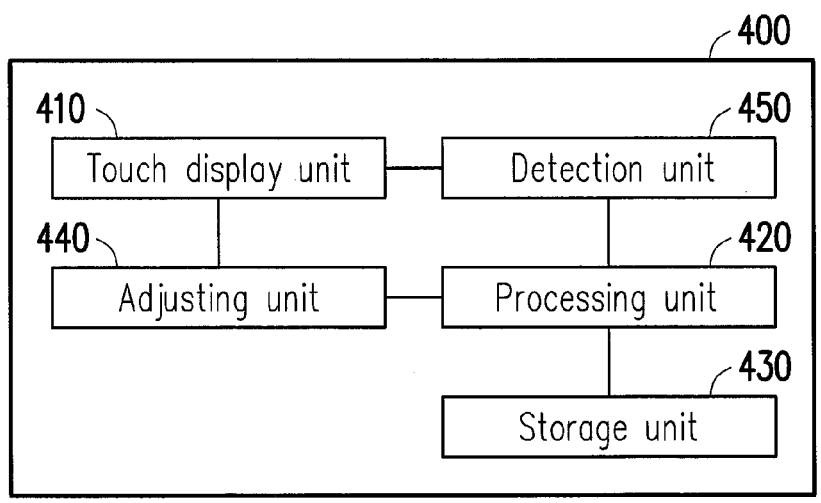

Another embodiment is provided below to describe implementation of another portable electronic apparatus. FIG. 4A and FIG. 4B are block diagrams of a portable electronic apparatus according to another embodiment of the application. In the present embodiment, the portable electronic apparatus 400 comprises a touch display unit 410, a processing unit 420, a storage unit 430, an adjusting unit 440, and a detection unit 450. The adjusting unit 440 and the detection unit 450 may be configured in the touch display unit 410, as that shown in FIG. 4A. Alternatively, the adjusting unit 440 and the detection unit 450 are not configured in the touch display unit 410, as that shown in FIG. 4B. Moreover, in other embodiments, the processing unit 420 may be directly coupled to the touch display unit 410 without coupling through the adjusting unit 440 and the detection unit 450.

In the present embodiment, functions of the touch display unit 410, the processing unit 420, and the storage unit 430 are similar to that of the touch display unit 110, the processing unit 120, and the storage unit 130, so that details thereof are not repeated.

The processing unit 420 is coupled to the touch display unit 410. The processing unit 420 activates the electronic notebook for displaying in the touch display unit 410, and enables a notebook function under the condition that the electronic notebook is activated, for example, a camera function, a sound recording function, or a video recording function, etc. For example, an application program is stored in the storage unit 430, and the application program is the electronic notebook having the sound recording function, and the processing unit 420 executes the application program stored in the storage unit 430 to activate the electronic notebook.

The adjusting unit 440 is coupled to the processing unit 420 and the touch display unit 410, and adjusts the touch display unit 410 to whether or not to enter the power saving mode under control of the processing unit 420. For example, the adjusting unit 440 is a control circuit of the touch display unit 410, and is used for adjusting a brightness of the touch display unit 410, which includes directly turning off the display frame of the touch display unit 410.

The detection unit 450 is coupled to the processing unit 420, and detects whether a trigger event is occurred. Moreover, the detection unit 450 is further coupled to the touch display unit 410. The detection unit 450 is, for example, a motion sensor, a touch sensor or a hand sensor. The motion sensor is, for example, an accelerometer or a gyroscope, etc. The touch sensor is, for example, a resistive sensor, a capacitive sensor, an ultrasonic sensor, or an optical (infrared) sensor, etc. Moreover, the detection unit 450 can detect whether an operation of ending the power saving mode is received from the user, for example, the user can press a power button or a specific button of the portable electronic apparatus 400 to enter the power saving mode, and can again press the power button or the specific button under the power saving mode to exit the power saving mode.

Figure 5:
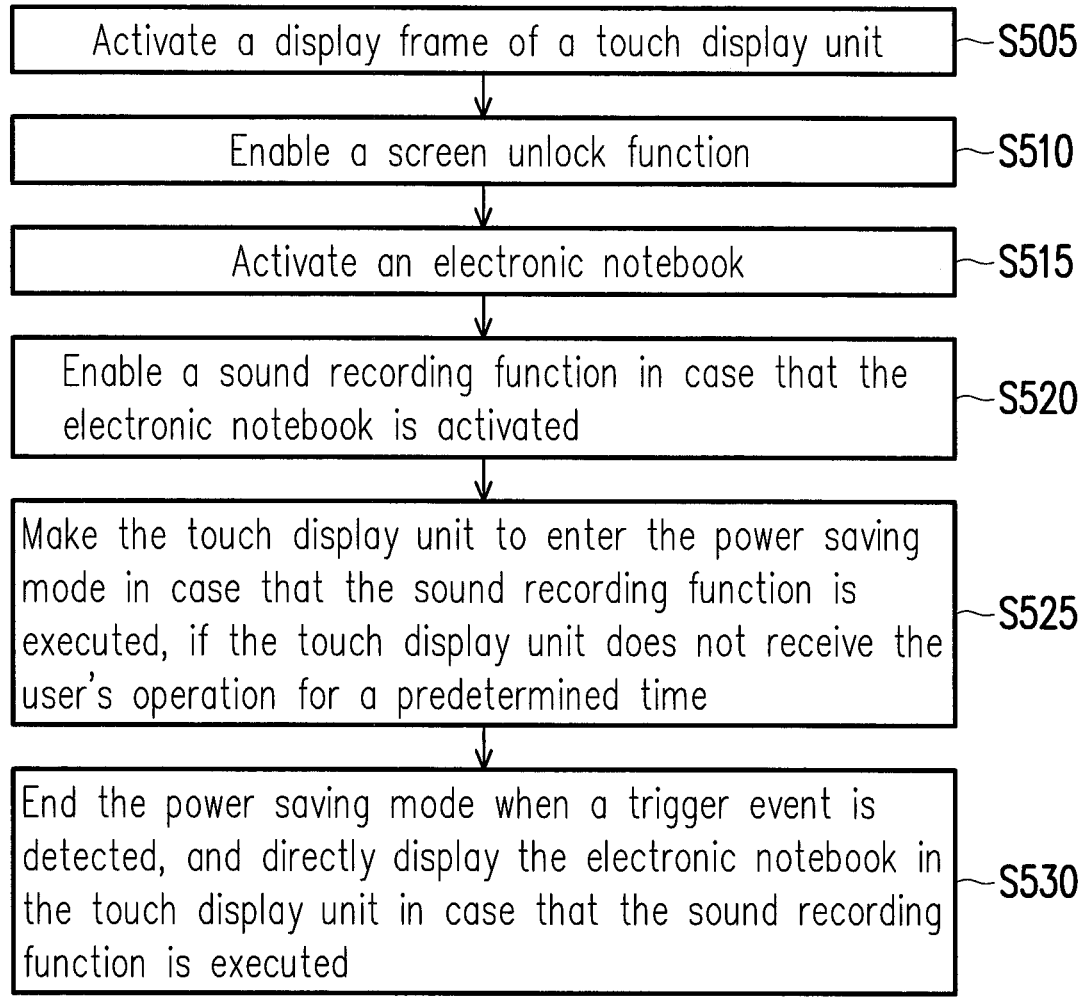
FIG. 5 is a flowchart of an operation method according to another embodiment of the application.

Another embodiment is provided below based on the aforementioned portable electronic apparatus 400. FIG. 5 is a flowchart of an operation method according to another embodiment of the application. In the present embodiment, the portable electronic apparatus 400 has entered the power saving mode, and the touch display unit 410 is turned off.

In step S505, first, the processing unit 420 activates the display frame of the touch display unit 410. For example, when the touch display unit 410 is enabled, the processing unit 420 receives a notification to activate the display frame of the touch display unit 410, and now the touch display unit 410 displays the screen lock mode.

Then, in step S510, a screen unlock function is enabled through the processing unit 420. For example, when the user executes a specific operation, namely a screen unlock action is detected, the processing unit 420 receives a screen unlock command to enable the screen unlock function, and the touch display unit 410 in the screen lock mode is unlocked by enabling the screen unlock function through the processing unit 420.

After the screen lock mode is unlocked, in step S515, an electronic notebook is activated. In step S520, under the condition that the electronic notebook is activated, an function of the electronic notebook is enabled, for example, the camera function, the sound recording function, or the video recording function. For example, the electronic notebook has the sound recording function, and when the user uses the electronic notebook, the sound recording function of the electronic notebook is simultaneously activated to perform a sound recording operation.

Then, in step S525, if the touch display unit 410 does not receive the user's operation for a predetermined period of time, under the condition that the sound recording function is executed, the touch display unit 410 enters the power saving mode. For example, the adjusting unit 440 is used to dim the brightness of the touch display unit 410, or directly turn off the display frame of the touch display unit 410, so as to enter the power saving mode.

Then, in step S530, when the processing unit 420 determines to detect a trigger event, it ends the power saving mode of the touch display unit 410, and under the condition that the sound recording function is executed, the electronic notebook is directly displayed in the touch display unit. Namely, under the condition that the portable electronic apparatus 400 does not activate the function of the electronic notebook, when the power saving mode is ended, the portable electronic apparatus 100 enters the screen lock mode first and then the user needs to unlock the screen lock mode. Under the condition that the user activates the electronic notebook and enables the sound recording function of the electronic notebook, when the power saving mode is ended, the electronic notebook is directly displayed without entering the screen lock mode. In an embodiment, the way to directly display the electronic notebook without displaying the screen lock mode after exiting the power saving mode may be in a manner of that when the touch display unit 410 enters the power saving mode, it does not enters the screen lock mode, or in a manner of that when the touch display unit 410 exits the power saving mode, it directly displays the electronic notebook by skipping the screen lock mode.

The portable electronic apparatus 400 may detect the trigger event through the detection unit 450, and when the trigger event is detected, the processing unit 420 is notified to end the power saving mode. For example, the trigger event may comprise following examples: if the detection unit 450 is a motion sensor, when a displacement of the portable electronic apparatus 100 is detected through the motion sensor, it is determined that the trigger event is detected. For example, after the portable electronic apparatus 400 is idled for a predetermined period of time, when the user wants to use the portable electronic apparatus 400 again, when the user picks up the portable electronic apparatus 400, the motion sensor can detect a displacement of the portable electronic apparatus 400.

Further, if the detection unit 450 is a touch sensor, when a touch signal on the touch display unit 410 or another touch unit is detected through the touch sensor, it is determined that the trigger event is detected. For example, after the touch display unit 410 enters the power saving mode, the user wants to use the portable electronic apparatus 400 again, and uses a finger or a stylus to touch the touch display unit 410 or another touch unit, and the touch sensor can detect the touch signal generated in the touch display unit 410.

Moreover, if the detection unit 450 is a hand sensor, when a touch object (for example, a finger or a palm) is detected within a specified range of the touch display unit 410 through the hand sensor, or when the touch object is directly detected by the touch display unit 410 or another touch unit, it is determined that the trigger event is detected. Namely, when the user's finger moves to the specified range of the touch display unit 410 or another touch unit or directly touch the touch display unit 410 or another touch unit, it represents that the trigger event is detected.

Moreover, the detection unit 450 may detect a user's operation of ending the power saving mode to serve as the trigger event. For example, under the power saving mode, the user presses the power button or the specific button of the portable electronic apparatus 400 to end the power saving mode.

In this way, when the trigger event is detected, it represents that the user wants to use the portable electronic apparatus 400 again, and the adjusting unit 440 is used to end the power saving mode of the touch display unit 410. For example, the adjusting unit 440 is used to adjust the brightness of the touch display unit 410 to its original setting or turn on the power of the touch display unit 410. Now, the display frame of the touch display unit 410 can be immediately recovered to a frame before the power saving mode is entered. Namely, the electronic notebook is displayed in the touch display unit 410. Then, an input information is received through the electronic notebook. Taking FIG. 3 as an example, the user may perform a write operation in the write page 320 through a touch object such as a finger or a stylus or through an input keyboard or hand writing input, etc.

When the input information is received, the processing unit 420 may establish a link between the input information and a recording time corresponding to a input time of the input information. Namely, when an input information is received after the sound recording is started for two minutes, the input time of the input information is 2 minutes after the sound recording is started. The processing unit 420 may add a time tag (for example, 2:00) in the input information. In this way, when the user opens the recorded notebook document later, the user may directly hear the related recorded content by using the time tag. The input information may comprise text messages inputted through a keyboard or hand writing input, and drawings and photographs, etc.

In another embodiment, a corresponding time bar is generated during sound recording, and the processing unit 420 may add an information tag to a corresponding time point on the time bar according to the input time of the input actions such as text input, drawing and photograph, etc., and the user may directly select the information tag on the time bar to hear the corresponding recorded content.

Further, the application provides computer readable media which records a computer program product for executing the operation method described above. The computer program product is composed of a plurality of program instructions (for example, an organization chart establishing program instruction, a table approving program instruction, a setting program instruction, and a deployment program instruction, etc), and these program instructions are loaded into the portable electronic apparatus and executed by the same to accomplish various steps of the aforementioned operation method and various functions of the portable electronic apparatus described above.

In summary, in the aforementioned embodiments, if the power saving mode is entered when the electronic notebook is activated or when the electronic notebook and the sound recording function are simultaneously activated, the screen lock mode is not entered and the electronic notebook can be directly displayed after the sound recording function is exited. In this way, the time used for unlocking a screen unlock action is saved, which helps improving operation convenience of the portable electronic apparatus.

It will be apparent to those skilled in the art that various modifications and variations can be made to the structure of the application without departing from the scope or spirit of the application. In view of the foregoing, it is intended that the application cover modifications and variations of this application provided they fall within the scope of the following claims and their equivalents.

What is claimed is:

1. An operation method, adapted to a portable electronic apparatus having a touch display unit, wherein the portable electronic apparatus has a power saving mode and a screen lock mode, and the operation method comprising:
   making the touch display unit to enter the power saving mode;
   ending the power saving mode when a trigger event is detected, and displaying the screen lock mode;
   ending the screen lock mode when a screen unlock action is detected;
   activating an electronic notebook and displaying the electronic notebook in the touch display unit;
   activating a video recording function of the electronic notebook;
   making the touch display unit to enter the power saving mode under the condition that the video recording function of the electronic notebook is activated; and
   ending the power saving mode when the trigger event is detected, and directly displaying the electronic notebook in the touch display unit without displaying the screen lock mode.

2. The operation method as claimed in claim 1, wherein the step of making the touch display unit to enter the power saving mode comprises:
   adjusting the brightness of the touch display unit.

3. The operation method as claimed in claim 1, wherein after the step of entering the power saving mode, the operation method further comprises:
   detecting the trigger event through a detection unit, and ending the power saving mode when the trigger event is detected, where the detection unit comprises at least one of a motion sensor, a touch sensor, and a. hand sensor; and the trigger event comprises one of following situations or combinations thereof: a displacement of the portable electronic apparatus is detected through the motion sensor, a touch signal of the touch display unit is detected through the touch sensor, a touch object is detected within a specified range of the touch display unit through the hand sensor, and a touch object is detected through the hand sensor.

4. The operation method as claimed in claim 1, further comprising:
   determining whether a sound recording function of the electronic notebook is simultaneously activated under the condition that the electronic notebook is activated; and
   if the touch display unit enters the power saving mode under the condition that the electronic notebook and the sound recording function are activated, directly displaying the electronic notebook in the touch display unit without displaying the screen lock mode when the trigger event is detected to end the power saving mode; and
   if the touch display unit enters the power saving mode under the condition that the electronic notebook is activated and the sound recording function is not activated, displaying the screen lock mode when the trigger event is detected to end the power saving mode.

5. The operation method as claimed in claim 1, further comprising:
   activating a sound recording function of the electronic notebook;
   receiving an input information through the electronic notebook; and
   establishing a link between the input information and a recording time corresponding to a input time of the input information when the input information is received.

6. The operation method as claimed in claim 1, further comprising:
   activating a sound recording function of the electronic notebook;
   establishing a time bar corresponding to a recording time when the sound recording function is activated;
   receiving an input information through the electronic notebook; and
   adding an information tag to the time bar corresponding to a time point of the input information, wherein a recorded content of the corresponding input information is played when the information tag is selected.

7. The operation method as claimed in claim 1, wherein when the portable electronic apparatus does not receive an operation for a predetermined period of time, the touch display unit enters the power saving mode.

8. The operation method as claimed in claim 1, further comprising:
displaying a shortcut related to the electronic notebook in the screen lock mode; and
when the short cut is triggered under the screen lock mode, the screen lock mode is directly unlocked and the function related to the short cut is executed.

9. A non-transitory computer readable media, storing a plurality of program instructions, and the program instructions are loaded into a portable electronic apparatus to accomplish following steps, wherein the portable electronic apparatus has a touch display unit, a power saving mode and a screen lock mode, and the steps comprising:
making the touch display unit to enter the power saving mode;
ending the power saving mode when a trigger event is detected, and displaying the screen lock mode;
ending the screen lock mode when a screen unlock action is detected;
activating an electronic notebook and displaying the electronic notebook in the touch display unit;
activating a sound recording function of the electronic notebook;
making the touch display unit to enter the power saving mode under the condition that the sound recording function of the electronic notebook is activated; and
ending the power saving mode when the trigger event is detected, and directly displaying the electronic notebook in the touch display unit without displaying the screen lock mode.

10. A portable electronic apparatus, having a power saving mode and a screen lock mode, comprising:
a touch display unit;
a processing unit, coupled to the touch display unit, activating an electronic notebook for displaying in the touch display unit and activating a sound recording function of the electronic notebook;
an adjusting unit, coupled to the processing unit and the touch display unit, and adjusting the portable electronic apparatus to enter the power saving mode or the screen lock mode; and
a detection unit, coupled to the processing unit, and detecting whether a trigger event for ending the power saving mode is occurred,
wherein when the electronic notebook is not activated and the adjusting unit adjusts the portable electronic apparatus to enter the power saving mode, if the detection unit detects the trigger event, the power saving mode is ended, and the screen lock mode is displayed in the touch display unit; when the sound recording function of the electronic notebook is activated and the adjusting unit adjusts the portable electronic apparatus to enter the power saving mode, if the detection unit detects the trigger event, the power saving mode is ended, and the electronic notebook is directly displayed in the touch display unit without displaying the screen lock mode.

11. The portable electronic apparatus as claimed in claim 10, wherein before the processing unit activates the electronic notebook, the touch display unit is in a normal operation mode.

12. The portable electronic apparatus as claimed in claim 10, wherein when the touch display unit is in the screen lock mode, the processing unit receives a screen unlock command to enable a screen unlock function, so as to unlock the screen lock mode.

13. The portable electronic apparatus as claimed in claim 10, wherein the processing unit activates the sound recording function of the electronic notebook, wherein if the touch display unit enters the power saving mode under the condition that the electronic notebook and the sound recording function are activated, when the trigger event is detected to end the power saving mode, the electronic notebook is directly displayed in the touch display unit without entering the screen lock mode; and if the touch display unit enters the power saving mode under the condition that the electronic notebook is activated and the sound recording function is not activated, the screen lock mode is entered when the trigger event is detected to end the power saving mode.

14. The portable electronic apparatus as claimed in claim 10, wherein the processing unit activates the sound recording function of the electronic notebook, and establishes a time bar corresponding to a recording time when the sound recording function is activated, and when an input information is received through the electronic notebook, an information tag is added to the time bar corresponding to a time point of the input information, wherein a recorded content of the corresponding input information is played when the information tag is selected.

15. The portable electronic apparatus as claimed in claim 10, wherein the adjusting unit comprises a brightness control circuit, and the brightness control circuit is adapted to adjust a brightness of the touch display unit.

16. The portable electronic apparatus as claimed in claim 10, wherein the detection unit comprises at least one of a motion sensor, a touch sensor, and a hand sensor, the trigger event comprises one of following situations or combinations thereof: a displacement of the portable electronic apparatus is detected through the motion sensor, a touch signal of the touch display unit is detected through the touch sensor, and a touch object is detected within a specified range of the touch display unit through the hand sensor.

17. The portable electronic apparatus as claimed in claim 10, wherein the processing unit further displays a shortcut related to the electronic notebook in the screen lock mode, and when the short cut is triggered under the screen lock mode, the screen lock mode is directly unlocked and the function related to the short cut is executed.

18. An operation method, adapted to a portable electronic apparatus having a touch display unit, wherein the portable electronic apparatus has a power saving mode and a screen lock mode, and the operation method comprising:
making the touch display unit to enter the power saving mode;
ending the power saving mode when a trigger event is detected, and displaying the screen lock mode;
ending the screen lock mode when a screen unlock action is detected;
activating an electronic notebook and displaying the electronic notebook in the touch display unit;
activating a sound recording function of the electronic notebook;
making the touch display unit to enter the power saving mode under the condition that the electronic notebook and the sound recording function are activated; and
ending the power saving mode when the trigger event is detected, and directly displaying the electronic notebook in the touch display unit without displaying the screen lock mode.

19. A portable electronic apparatus, having a power saving mode and a screen lock mode, comprising:

a touch display unit;
a processing unit, coupled to the touch display unit, activating an electronic notebook for displaying in the touch display unit and activating a video recording function of the electronic notebook;
an adjusting unit, coupled to the processing unit and the touch display unit, and adjusting the portable electronic apparatus to enter the power saving mode or the screen lock mode; and
a detection unit, coupled to the processing unit, and detecting whether a trigger event for ending the power saving mode is occurred,
wherein when the electronic notebook is not activated and the adjusting unit adjusts the portable electronic apparatus to enter the power saving mode, if the detection unit detects the trigger event, the power saving mode is ended, and the screen lock mode is displayed in the touch display unit; when the video recording function of the electronic notebook is activated and the adjusting unit adjusts the portable electronic apparatus to enter the power saving mode, if the detection unit detects the trigger event, the power saving mode is ended, and the electronic notebook is directly displayed in the touch display unit without displaying the screen lock mode.

* * * * *